United States Patent
Czegledi et al.

(10) Patent No.: US 12,143,245 B2
(45) Date of Patent: Nov. 12, 2024

(54) MULTIPLE-INPUT-MULTIPLE-OUTPUT (MIMO) CHANNEL ESTIMATION

(71) Applicant: Telefonaktiebolaget LM Ericsson (publ), Stockholm (SE)

(72) Inventors: Cristian Czegledi, Gothenburg (SE); Lei Bao, Gothenburg (SE); Sinh Nguyen, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/039,575

(22) PCT Filed: Dec. 3, 2020

(86) PCT No.: PCT/EP2020/084482
§ 371 (c)(1),
(2) Date: May 31, 2023

(87) PCT Pub. No.: WO2022/117193
PCT Pub. Date: Jun. 9, 2022

(65) Prior Publication Data
US 2024/0073062 A1 Feb. 29, 2024

(51) Int. Cl.
*H04L 25/02* (2006.01)
*H04L 25/03* (2006.01)

(52) U.S. Cl.
CPC .... *H04L 25/0204* (2013.01); *H04L 25/03038* (2013.01); *H04L 2025/03426* (2013.01)

(58) Field of Classification Search
CPC ........... H04L 25/0204; H04L 25/03038; H04L 2025/03426; H04B 1/0035; H04B 7/0845; H04B 7/0671; H04B 7/0617
See application file for complete search history.

(56) References Cited

U.S. PATENT DOCUMENTS

2003/0109225 A1* 6/2003 Aldajani ............. H04W 52/223
455/504
2011/0249185 A1* 10/2011 Elsherif ................. H04N 5/211
348/572

OTHER PUBLICATIONS

International Search Report and Written Opinion issued in International Application No. PCT/EP2020/084482 dated Aug. 11, 2021 (11 pages).

(Continued)

*Primary Examiner* — Sung S Ahn
(74) *Attorney, Agent, or Firm* — Rothwell, Figg, Ernst & Manbeck, P.C.

(57) ABSTRACT

Method for propagation channel estimation in an N×M Multiple-Input-Multiple-Output (MIMO) communication system comprising a transmitter (202) comprising N transmit antennas and a receiver (204) comprising M receive antennas and a MIMO equalizer (206) comprising multiple taps, where N>1 and M>1. The method includes producing (s402) a single tap equalizer (Q) based on a multi-tap equalizer (Q). The method also includes producing (s404) an inverse effective-channel estimate ($Q_e$) based on Q, The method also includes inverting (s406) $Q_e$ to produce an effective-channel estimate ($H_e$), The method also includes producing (s408) $H_a$ based on $H_e$—wherein $H_a$ can be used to determine one or more performance metrics.

19 Claims, 5 Drawing Sheets

(56) References Cited

OTHER PUBLICATIONS

Farhang-Boroujeny, B., "Filter Bank Multicarrier Modulation: a Waveform Candidate for 5G and Beyond", Advances in Electrical Engineering, vol. 50, No. 5, Dec. 21, 2014 (27 pages).
Larsson, P., "Lattice array receiver and sender for spatially orthonormal MIMO communication," in 2005 IEEE 61st Vehicular Technology Conference, 2005, vol. 1 (5 pages).
Sjodin, M., et. al., "A 40.2 bps/Hz Single Polarization 4×4 Line-of-Sight MIMO Link With Unsynchronized Oscillators," in 2019 IEEE Radio and Wireless Symposium (RWS), 2019 (3 pages).

* cited by examiner

MULTIPLE-INPUT-MULTIPLE-OUTPUT (MIMO) CHANNEL ESTIMATION

CROSS REFERENCE TO RELATED APPLICATIONS

This application is a 35 U.S.C. § 371 National Stage of International Patent Application No. PCT/EP2020/084482, filed 2020 Dec. 3.

TECHNICAL FIELD

This disclosure relates to channel estimation in a MIMO communication system.

BACKGROUND

Multiple-Input-Multiple-Output (MIMO) is a technology that can be used to support high data-rates. It is expected that in future telecommunication systems certain links, such as microwave line-of-sight (LOS) backhaul links, will require high data rates to support, for example, an expected increase in mobile data traffic. MIMO technology increases the spectral efficiency in point-to-point links by utilizing parallel spatial data streams on the same frequency band (see, e.g., reference [1]). A MIMO system (e.g., an LOS-MIMO system) comprises of N transmitters and M receivers, often referred to as an N×M MIMO system.

In order to maximize performance, for each specific link, there exists an optimal geometric antenna deployment such that the capacity of the link is maximized. This deployment depends on the number of antennas, separation distance between the collocated antennas at transmitter/receiver site, and carrier frequency. A LOS-MIMO link was demonstrated to achieve a spectrum efficiency as high as 40.2 bps/Hz with 4096-QAM in a 14 MHz channel on a link at 28 GHz (see reference [2]).

The performance of a MIMO link highly depends on the propagation channel. In order to assess the performance of the link, the propagation channel (or "channel" for short) is estimated and represented using a matrix. This matrix can in turn be used to estimate the performance of the link, assess propagation conditions, set digital-signal-processing (DSP) parameters, etc.

SUMMARY

Certain challenges presently exist. For instance, typically, the effective channel is estimated from the taps of the MIMO equalizer, and considering single-tap ($N_{taps}=1$) FIR filters, the channel matrix is estimated as $H=Q^{-1}$, where Q is the single-tap MIMO equalizer matrix. But there are several issues with this approach: i) It is not straight forward how to apply the inverse operation when Q is a multi-tap filter bank; ii) The estimate is accurate only when there is no phase noise and the gain of the automatic gain controllers (AGCs) is the same on all branches.

This disclosure provides embodiments that overcome the limitations discussed above, which allows one to quantify the quality of the channel, such as: singular values, condition number, cross-polarization interference (XPI), power gain/attenuation during propagation, MIMO carrier-to-interference ratio (C/I) between the main stream and interference stream, etc.

For example, in one aspect there is provided a method for propagation channel estimation in an N×M MIMO communication system comprising a transmitter comprising N transmit antennas, a receiver comprising M receive antennas, and a MIMO equalizer comprising multiple taps, where N>1 and M>1. The method includes producing a single tap equalizer ($\overline{Q}$) based on a multi-tap equalizer (Q). The method also includes producing an inverse effective-channel estimate ($Q_e$) based on $\overline{Q}$. The method also includes inverting $Q_e$ to produce an effective-channel estimate ($H_e$). The method further includes producing $H_a$ based on $H_e$, wherein $H_a$ can be used to determine one or more performance metrics.

In another aspect there is provided a computer program comprising instructions which when executed by processing circuitry of a channel estimator causes the channel estimator to perform the above method. In another aspect there is provided a carrier containing the computer program of embodiment 14, wherein the carrier is one of an electronic signal, an optical signal, a radio signal, and a computer readable storage medium.

In another aspect there is provided a channel estimator. The channel estimator is adapted to produce a single tap equalizer ($\overline{Q}$) based on a multi-tap equalizer (Q). The channel estimator is further adapted to produce an inverse effective-channel estimate ($Q_e$) based on $\overline{Q}$. The channel estimator is adapted to invert $Q_e$ to produce an effective-channel estimate ($H_e$). The channel estimator is further adapted to produce $H_a$ based on $H_e$, wherein $H_a$ can be used to determine one or more performance metrics.

In another aspect there is provided a channel estimator that comprises processing circuitry a memory, The memory contains instructions executable by the processing circuitry, whereby the channel estimator is operative to the above described method.

The embodiments are capable of estimating some of the properties of the true channel matrix that are used to quantify the quality of the channel, such as: singular values, condition number, cross-polarization interference (XPI), power gain/attenuation during propagation. The embodiments work regardless of the size of the FIR filters used in the equalizer and work in the presence of the phase noise. Moreover, the embodiments take into account the AGC gains.

BRIEF DESCRIPTION OF THE DRAWINGS

The accompanying drawings, which are incorporated herein and form part of the specification, illustrate various embodiments.

DETAILED DESCRIPTION

Figure 1:
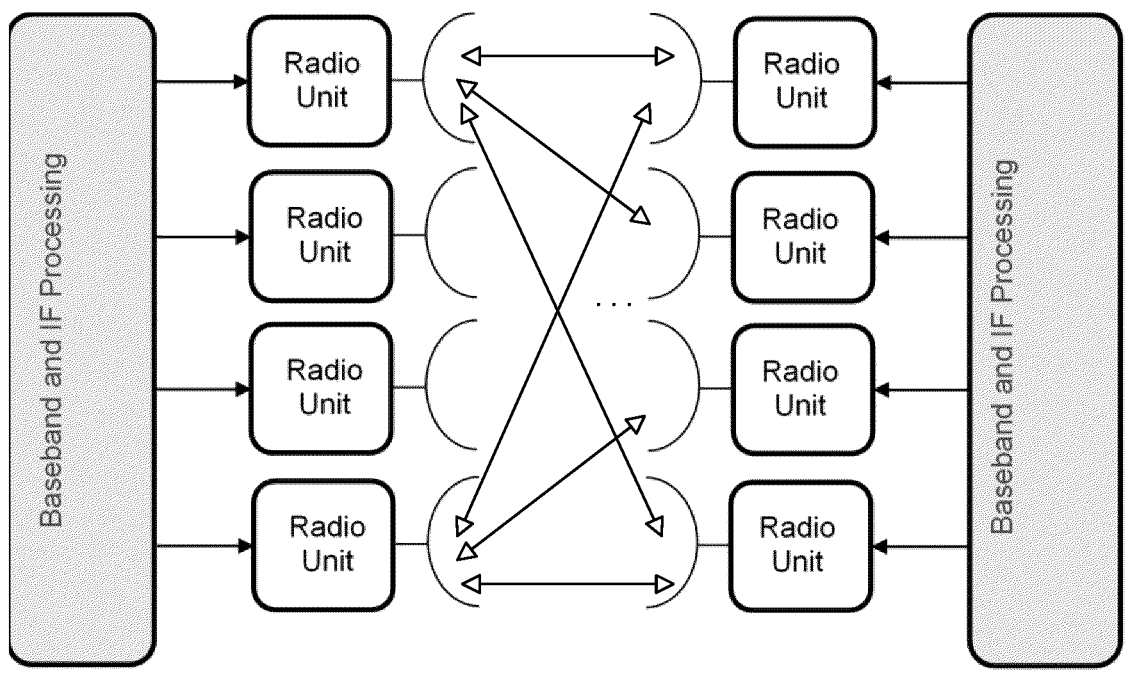
FIG. 1 illustrates a 4×4 LOS-MIMO communication system according to an embodiment.

FIG. 1 illustrates a LOS-MIMO communication system 100 according to some embodiments. As shown in FIG. 1, LOS-MIMO communication system 100 comprises is a 4×4 LO-MIMO system (i.e., the MIMO communication system has four transmitters and 4 receivers). As noted above, the performance of the MIMO link highly depends on the propagation channel, and in order to assess the performance of the MIMO link, the propagation channel (or "channel" for short) is estimated and represented using a matrix. This matrix can in turn be used to estimate the performance of the MIMO link, assess propagation conditions, set digital-signal-processing (DSP) parameters, etc. For example, the matrix can be sent to a central node as input for network-level traffic planning and/or routing planning.

The channel can be estimated using a MIMO equalizer, which is used to de-multiplex the MIMO streams (i.e., invert the propagation channel and remove the interference from the other streams). In an N×M MIMO system, the MIMO equalizer is composed of N×M finite impulse response filters (FIR) and N×M phase shifters. The FIR filters compensate for the MIMO channel and for various hardware imperfections such as frequency domain ripple. The phase shifters compensate for the combined phase noise and frequency offset coming from the transmit (TX) and receive (RX) local oscillators.

The FIR filters and the phase shifters are dynamically adjusted during transmission such that they adapt to the propagation channel. They are typically adjusted based on an error function calculated at a slicer in the DSP chain based on various algorithms, such as, least mean square gradient descent, Kalman filters, etc. In most of the cases, the LOS-MIMO propagation channel does not experience any multipath, therefore the FIR filters of the MIMO equalizer can be single-tap filters, but they are chosen to be multitap in order to compensate for hardware imperfections.

Figure 2:
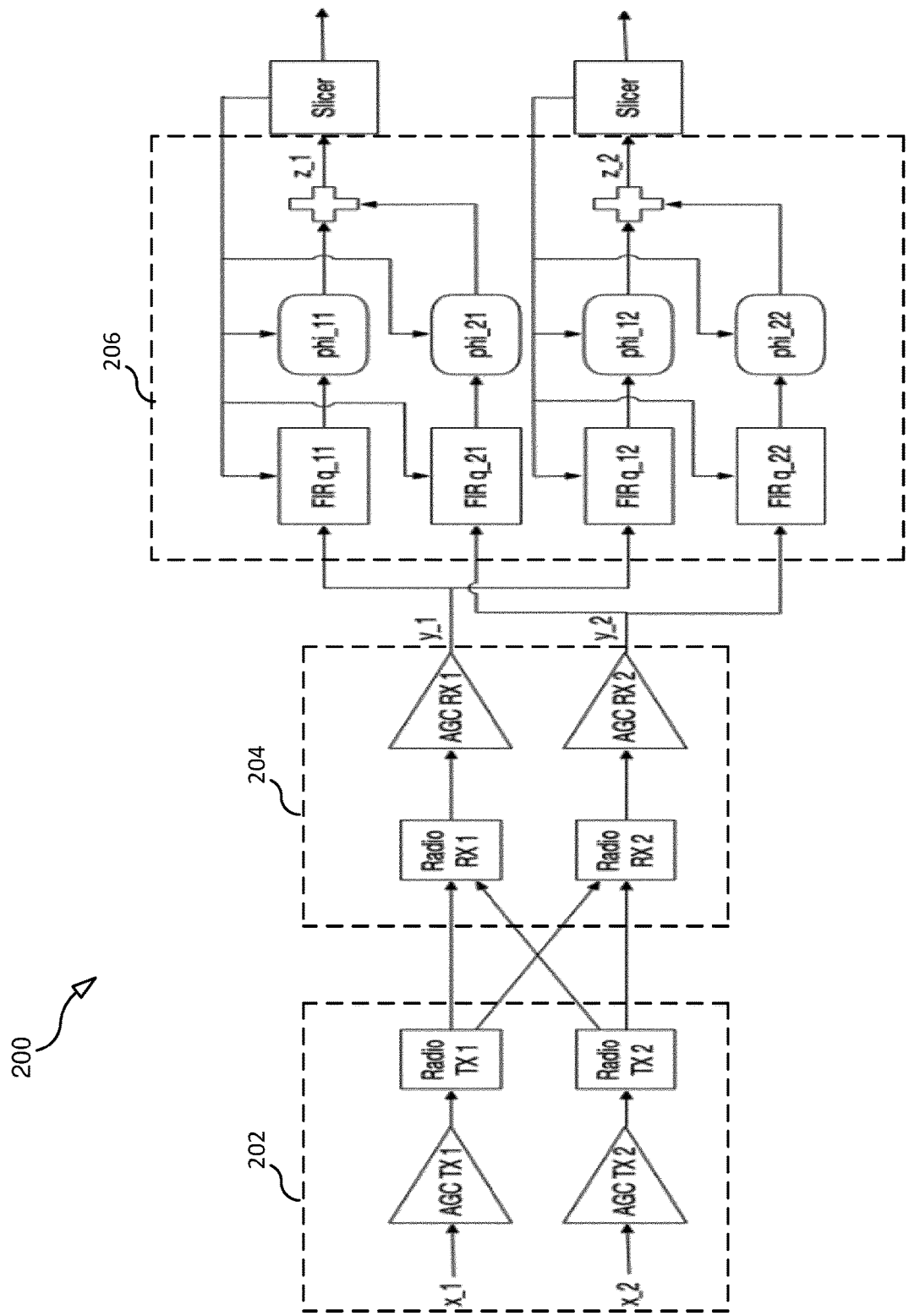
FIG. 2 illustrates a 2×2 MIMO communication system according to an embodiment.

FIG. 2 shows the schematic for an example 2×2 MIMO communication system 200 having a transmitter 202, a receiver 204, a MIMO equalizer 206 coupled to the output of receiver 204, and two slicers. The transmitter 202 comprises a first AGC (AGC TX1), a second AGC (AGC TX2), a first radio RX unit coupled to AGC TX, and a second radio RX unit coupled to AGC TX2. Similarly, the receiver 204 comprises a first AGC (AGC RX1), a second AGC (AGX RX2), a first radio RX unit coupled to AGC RX1, and a second radio RX unit coupled to ACX RX2; 3) The purpose of the AGCs is to ensure that the transmitted/received signal power level is kept constant at a certain level. In this example, receiver 204 is within the LOS of transmitter 202.

In this example, MIMO equalizer 206 is made of 4 FIR filters and 4 phase shifters, which are adjusted based on a control signal coming from the respective slicer. This implementation adjusts $\phi\_mn$ and $q\_mn$ based on the feedback signal only from the slicer n. This implementation allows the different receiver chains to be implemented and processed in parallel, which reduces the requirements on the FPGA/ASIC implementations.

The signal before the MIMO equalizer 206 (denoted Y) can be modelled as:

$$Y = \begin{bmatrix} y_1 \\ \vdots \\ y_M \end{bmatrix} = G_{RX} P_{RX} H P_{TX} G_{TX} X + B,$$

where $$X = \begin{bmatrix} x_1 \\ \vdots \\ x_N \end{bmatrix}$$

is the transmitted signal, $$G_{TX} = \begin{bmatrix} G_{TX_1} & \cdots & 0 \\ \vdots & \ddots & \vdots \\ 0 & \cdots & G_{TX_N} \end{bmatrix}$$

is the AGC gain at the transmitter, $$P_{TX} = \begin{bmatrix} e^{j\theta_1} & \cdots & 0 \\ \vdots & \ddots & \vdots \\ 0 & \cdots & e^{j\theta_N} \end{bmatrix}$$

is the phase noise at the transmitter, $$H = \begin{bmatrix} h_{11} & \cdots & h_{1N} \\ \vdots & \ddots & \vdots \\ h_{M1} & \cdots & h_{MN} \end{bmatrix}$$

is the MIMO propagation channel, $$P_{RX} = \begin{bmatrix} e^{j\rho_1} & \cdots & 0 \\ \vdots & \ddots & \vdots \\ 0 & \cdots & e^{j\rho_M} \end{bmatrix}$$

is the phase noise at the receiver, $$G_{RX} = \begin{bmatrix} G_{RX_1} & \cdots & 0 \\ \vdots & \ddots & \vdots \\ 0 & \cdots & G_{RX_M} \end{bmatrix}$$

is the AGC gain at the receiver, and $$B = \begin{bmatrix} b_1 \\ \vdots \\ b_M \end{bmatrix}$$

is the additive noise added at the receiver. The output of the equalizer is $$Z = \begin{bmatrix} z_1 \\ \vdots \\ z_N \end{bmatrix} = (Q \circ \Phi) * Y,$$

where $$Q = \begin{bmatrix} q_{11}[k] & \cdots & q_{1M}[k] \\ \vdots & \ddots & \vdots \\ q_{N1}[k] & \cdots & q_{NM}[k] \end{bmatrix}$$

is the filter bank with the FIR filters of size $N_{taps}$ and $k=1 \ldots N_{taps}$ with a sampling rate $F_s = F_B O_F$, where $F_B$ is the baud rate of the signal and $O_F$ is the oversampling factor, $$\Phi = \begin{bmatrix} e^{j\phi_{11}} & \cdots & e^{j\phi_{1M}} \\ \vdots & \ddots & \vdots \\ e^{j\phi_{N1}} & \cdots & e^{j\phi_{NM}} \end{bmatrix}$$

is a matrix compensating for the phase noise, and ∘ is the element-wise Hadamard product.

Note that both Q and Φ converge to inverse of true channel and phase noise.

Typically, the effective channel is estimated from the taps of the MIMO equalizer 206. Considering single-tap FIR filters, the channel matrix is estimated as $\hat{H}=Q^{-1}$. However, there are several issues with this approach: i) it is not straight forward how to apply the inverse operation when Q is a multi-tap filter bank; and ii) the estimate is accurate only when there is no phase noise and the gain of the AGCs is the same on all branches.

Figure 3:
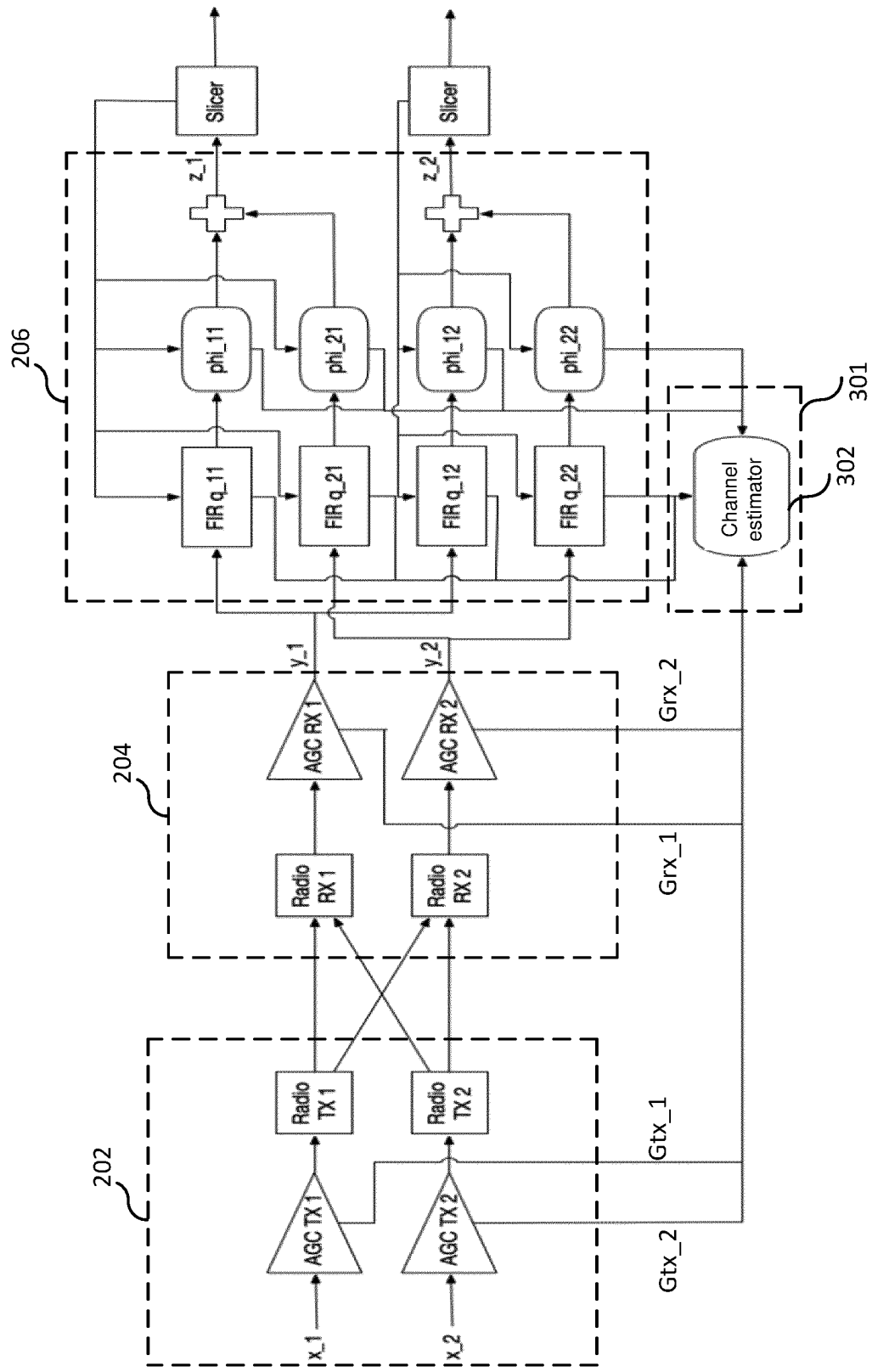
FIG. 3 illustrates a MIMO communication system including a channel estimator according to an embodiment.

This disclosure provides a channel estimator 302 (see FIG. 3) to overcome the limitations discussed above, which allows one to quantify the quality of the channel, such as: singular values, condition number, cross-polarization interference (XPI), power gain/attenuation during propagation. As shown in FIG. 3, channel estimator 302, in this embodiments, receives information indicating the gain of each of AGCs. Channel estimator 302 may be a component of a baseband processor for the receiver. In another embodiment, channel estimator 302 is a component of a network node 301, which network node 301 may be located remotely from receiver 204 and/or equalizer 206.

Figure 4:
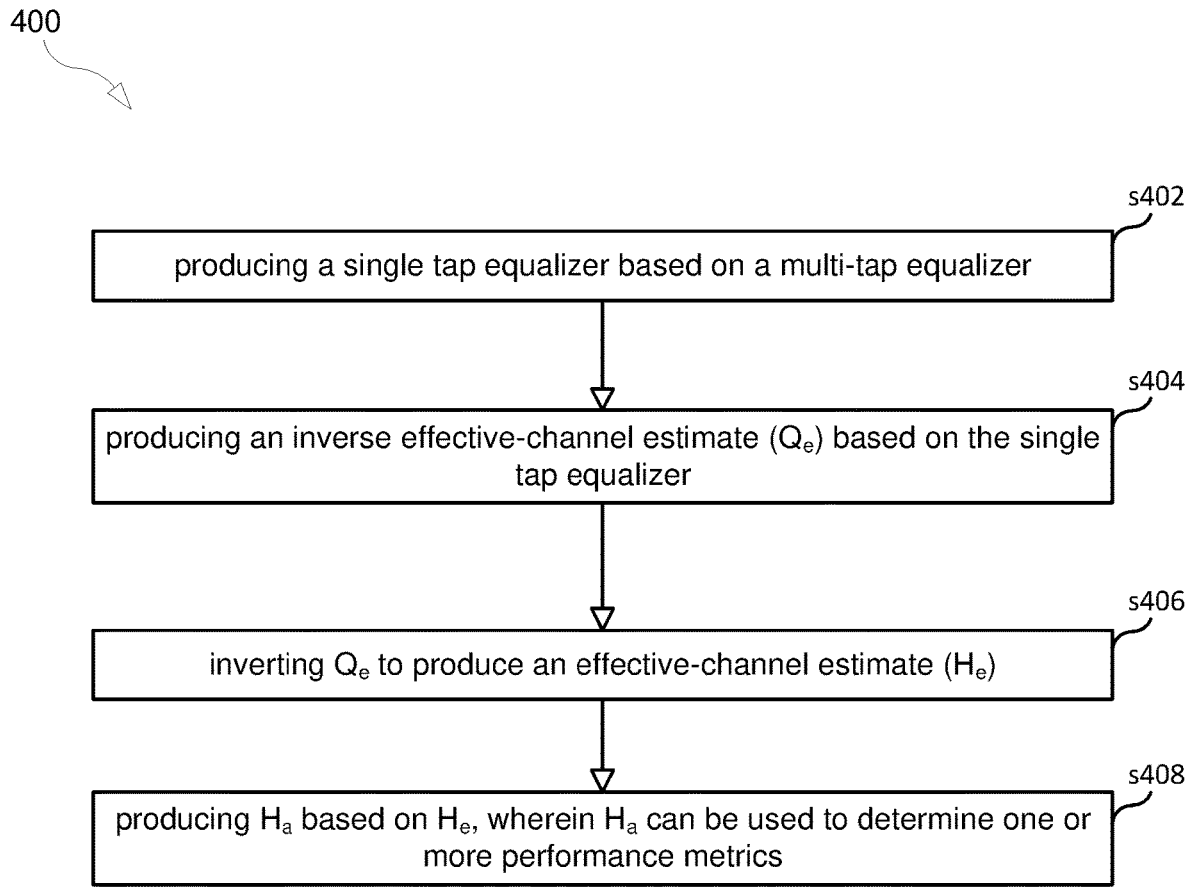
FIG. 4 is a flowchart illustrating a process according to an embodiment.

FIG. 4 is a flow chart illustrating a process 400 performed by a channel estimator (e.g., channel estimator 302) for propagation channel estimation in an N×M (e.g., 2×2 or 4×4) MIMO communication system comprising a transmitter comprising N transmit antennas and a receiver comprising M receive antennas and MIMO equalizer 206 comprising multiple taps, where N>1 and M>1.

Process 400 may begin in steps s402. Step s402 comprises producing a single tap equalizer ($\bar{Q}$) based on a multi-tap equalizer (Q). Step s404 comprises producing an inverse effective-channel estimate ($Q_e$) based on $\bar{Q}$. Step s406 comprises inverting $Q_e$ to produce an effective-channel estimate ($H_e$). And step s408 comprises producing $H_a$ based on $H_e$, wherein $H_a$ can be used to determine one or more performance metrics (i.e., $H_a$ represents the propagation channel). That is, the estimate $H_a$ is the estimate of the combination between the propagation channel and phase noise from the TX and RX local oscillators (LOs); therefore, it cannot be used to examine the propagation channel (H) directly, but it shares some of the properties of H such as: singular values, condition number, XPI, power gain/attenuation during propagation, which can be used to, e.g., estimate the performance of the link, assess propagation conditions, set DSP parameters, etc.

In some embodiments, prior to performing process 400, channel estimator 302 first determines whether the MIMO equalizer has reached convergence based on, for example, the bit-error-rate (BER), mean-square-error (MSE), or packer-error-rate (PER). In such an embodiment, channel estimator 302 performs process 400 in response to determining that the MIMO equalizer has reached convergence.

In some embodiments, producing $\bar{Q}$ comprises: computing $Q_F = \mathfrak{F}(Q)$, where $\mathfrak{F}$ is an element-wise Fourier transform, and then setting:

$$\bar{Q} = \left(\frac{1}{N_u - N_l + 1} \sum_{k=N_l}^{N_u} |Q_F[k]|\right) e^{j \frac{1}{N_u - N_l + 1} \sum_{k=N_l}^{N_u} \angle(Q_F[k])},$$

where
∠(•) is the angle operation,
$O_F$ is an oversampling factor, $N_{taps}$ is the number of tapes of the multi-tap equalizer (Q), and $N_l$ and $N_u$ are choses based on, for example, the sampling rate. In one embodiment, $$N_l = \left\lceil \frac{N_{taps}(O_F - 1)}{cO_F} \right\rceil,$$

$$N_u = \left\lfloor \frac{N_{taps}(O_F + 1)}{cO_F} \right\rfloor,$$

where c is a predetermined constant (eg., c=2, c=3, etc.)

In some embodiments, producing $Q_e$ based on $\bar{Q}$ comprises producing $Q_e$ by combining $\bar{Q}$ with phase shifters. For example, producing $Q_e$ based on $\bar{Q}$ may comprise calculating:

$Q_e = \bar{Q} \circ \Phi$, where

Φ=a phase noise compensating matrix, and
∘ is the element-wise Hadamard product.

In some embodiments, inverting $Q_e$ to produce the effective-channel estimate ($H_e$) comprises setting $H_e$ equal to: $(Q_e^*(Q_e Q_e^*))^{-1}$, where (•)* is the conjugate-transpose operation.

In some embodiments, producing $H_a$ based on $H_e$ comprises compensating for an automatic gain control (AGC) imbalance using $H_e$, thereby producing $H_a$.

In some embodiments, producing $H_a$ based on $H_e$ comprises setting $H_a$ equal to: $P_{RX}^{-1} H_e P_{TX}^{-1}$, where $P_{RX}$ is a first matrix representing gains applied by the M AGCs of the receiver, and $P_{TX}$ is a second matrix representing gains applied by the N AGCs of the transmitter. In one embodiment, $$P_{TX}^{-1} = \begin{bmatrix} \frac{1}{G_{TX_1}} & \cdots & 0 \\ \vdots & \ddots & \vdots \\ 0 & \cdots & \frac{1}{G_{TX_N}} \end{bmatrix},$$

$$P_{RX}^{-1} = \begin{bmatrix} \frac{1}{G_{RX_1}} & \cdots & 0 \\ \vdots & \ddots & \vdots \\ 0 & \cdots & \frac{1}{G_{RX_M}} \end{bmatrix},$$

$Gtx_i$ is the gain of the i-th AGC of the transmitter, and
$Grx_i$ is the gain of the i-th AGC of the receiver.

In some embodiments, process 400 further includes calculating one or more performance metric using $H_a$. In some embodiments, calculating one or more performance metric using $H_a$ comprises calculating a mean-square-error (MSE) for a slice using $H_a$ as input to the calculation (i.e., the mean squared error between $H_a^{-1} * y - x$, where y are the received samples and x are the closest constellation points to $H_a^{-1} * y$. In some embodiments, calculating one or more performance metric using $H_a$ comprises determining one or more of: the singular values of $H_a$, a condition number associated with $H_a$, cross-polarization isolation, XPI, a power gain, a carrier-to-interference ratio. In one embodiment, calculating XPI comprises calculating: the ratio between $abs(H_a(n\_x, m\_x))^2$ and $abs(H_a(n\_y, m\_y))^2$, where $H_a(n\_x, m\_x)$ is the estimated channel gain from TX antenna n and RX antenna m on polarization x, whereas $H_a(n\_y, m\_y)$ is the estimated channel gain from TX antenna n and RX antenna m on polarization y.

Figure 5:
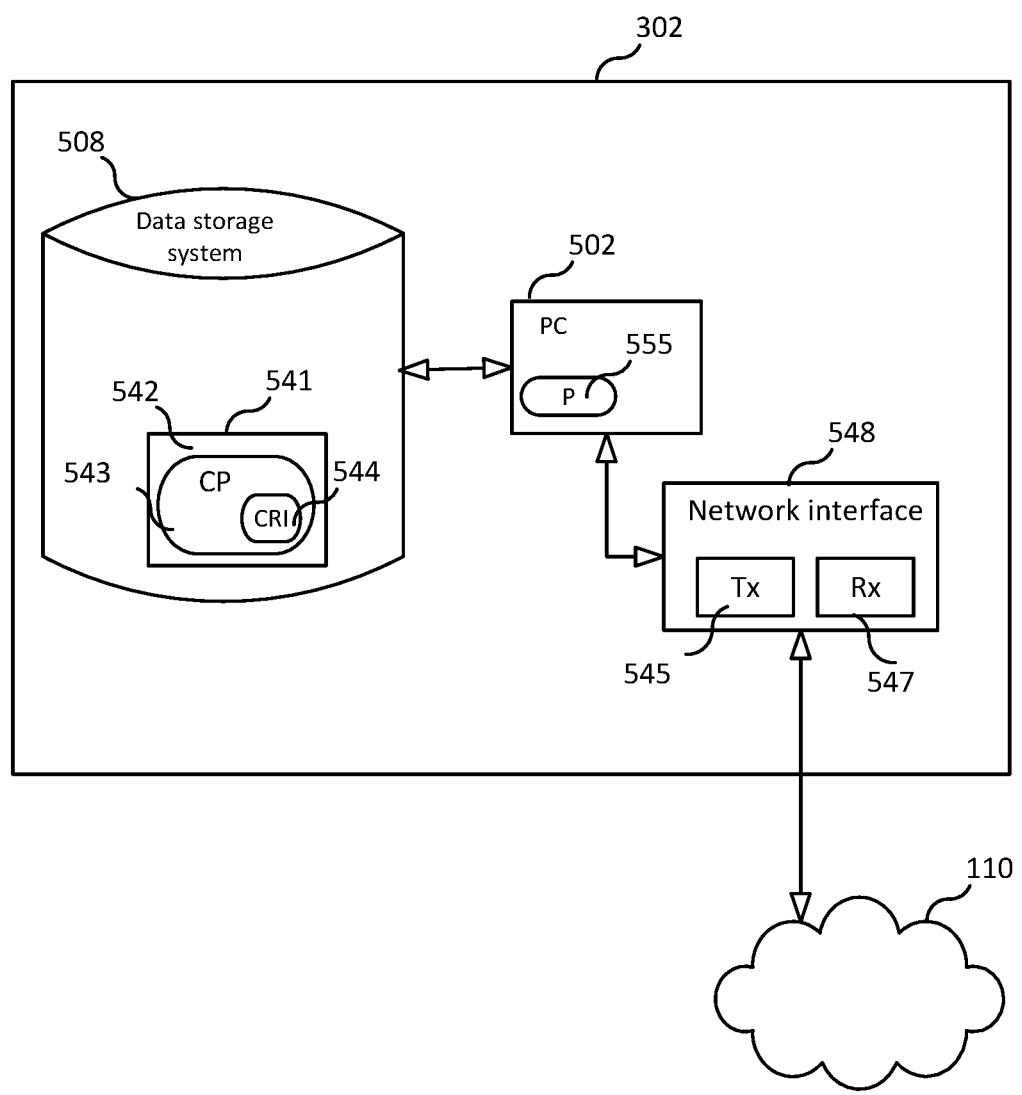
FIG. 5 illustrates a channel estimator according to an embodiment.

FIG. 5 is a block diagram of channel estimator 302, according to some embodiments. As shown in FIG. 5, channel estimator 302 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., channel estimator 302 may be a distributed computing apparatus); and a local storage unit (a.k.a., "data storage system") 508, which may include one or more non-volatile storage devices and/or one or more volatile storage devices. Channel estimator may also include at least one network interface 548 comprising a transmitter (Tx) 545 and a receiver (Rx) 547 for enabling channel estimator 302 to transmit data to and receive data from other nodes connected to a network 110 (e.g., an Internet Protocol (IP) network) to which network interface 548 is connected.

In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes channel estimator 302 to perform steps described herein (e.g., steps described herein with reference to the flow charts). In other embodiments, channel estimator 302 may be configured to perform steps described herein without the need for code. That is, for example, PC 502 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Larsson, P., "Lattice array receiver and sender for spatially orthonormal MIMO communication," in 2005 IEEE 61st Vehicular Technology Conference, 2005, pp. 192-196 Vol. 1.

[2] Sjodin, M., et. al., "A 40.2 bps/Hz Single Polarization 4×4 Line-of-Sight MIMO Link With Unsynchronized Oscillators," in 2019 IEEE Radio and Wireless Symposium (RWS), 2019, pp. 1-3.

The invention claimed is:

1. A method for propagation channel estimation in an N×M Multiple-Input-Multiple-Output (MIMO) communication system comprising a transmitter comprising N transmit antennas and a receiver comprising M receive antennas and a MIMO equalizer comprising multiple taps, where N>1 and M>1, the method comprising:

producing a single tap equalizer ($\bar{Q}$) based on a multi-tap equalizer (Q);

producing an inverse effective-channel estimate ($Q_e$) based on $\bar{Q}$;

inverting $Q_e$ to produce an effective-channel estimate ($H_e$); and producing $H_a$ based on $H_e$, wherein $H_a$ can be used to determine one or more performance metrics.

2. The method of claim 1, wherein producing $\bar{Q}$ comprises:

computing $Q_F = \mathfrak{F}(Q)$, where $\mathfrak{F}$ is an element-wise Fourier transform.

3. The method of claim 2, wherein producing $\bar{Q}$ further comprises: setting $$\bar{Q} = \left(\frac{1}{N_u - N_l + 1}\sum_{k=N_l}^{N_u}|Q_F[k]|\right)e^{j\frac{1}{N_u-N_l+1}\sum_{k=N_l}^{N_u}\angle(Q_F[k])},$$

where $\angle(\bullet)$ is the angle operation, $O_F$ is an oversampling factor, $N_{taps}$ is the number of tapes of the multi-tap equalizer (Q), and $N_l$ and $N_u$ are predetermined values.

4. The method of claim 1, wherein producing $Q_e$ based on $\bar{Q}$ comprises producing $Q_e$ by combining $\bar{Q}$ with phase shifters.

5. The method of claim 1, wherein producing $Q_e$ based on $\bar{Q}$ comprises calculating:

$Q_e = \bar{Q} \circ \Phi$, where $\Phi$ = a phase noise compensating matrix, and $\circ$ is the element-wise Hadamard product.

6. The method of claim 1, wherein inverting $Q_e$ to produce the effective-channel estimate ($H_e$) comprises setting $H_e$ equal to:

$(Q_e^*(Q_eQ_e^*)^{-1}$, where $(\bullet)^*$ is the conjugate-transpose operation.

7. The method of claim 1, wherein producing $H_a$ based on $H_e$ comprises compensating for an automatic gain control (AGC) imbalance using $H_e$, thereby producing $H_a$.

8. The method of claim 1, wherein the transmitter comprises N automatic-gain-controllers (AGCs), the receiver comprises M AGCs, producing $H_a$ based on $H_e$ comprises setting $H_a$ equal to: $P_{RX}^{-1} H_e P_{TX}^{-1}$, where $P_{RX}$ is a first matrix representing gains applied by the M AGCs of the receiver, and $P_{TX}$ is a second matrix representing gains applied by the N AGCs of the transmitter.

9. The method of claim 1, further comprising calculating one or more performance metrics using $H_a$.

10. The method of claim 9, wherein calculating one or more performance metrics using $H_a$ comprises calculating a mean-square-error (MSE) using $H_a$ as input to the calculation.

11. The method of claim 9, wherein calculating one or more performance metrics using $H_a$ comprises determining:
the singular values of $H_a$,
a condition number associated with $H_a$,
cross-polarization isolation, XPI,
a power gain, and/or
carrier-to-interference ratio between a MIMO main stream and one or more interference streams.

12. The method of claim 1, wherein the receiver is within the line-of-sight (LOS) of the transmitter.

13. The method of claim 1, wherein the method is performed by a baseband processor of the receiver.

14. The method of claim 1, wherein the method is performed by a channel estimator of a network node.

15. The method of claim 14, wherein the network node is located remotely from the receiver.

16. The method of claim 3, wherein $$N_l = \left\lceil \frac{N_{taps}(O_F - 1)}{cO_F} \right\rceil,$$

$$N_u = \left\lfloor \frac{N_{taps}(O_F + 1)}{cO_F} \right\rfloor,$$

and
c is a predetermined value.

17. A non-transitory computer readable storage medium storing a computer program comprising instructions which when executed by processing circuitry of a channel estimator causes the channel estimator to perform the method of claim 1.

18. A channel estimator, the channel estimator comprising:
processing circuitry; and
a memory, the memory containing instructions executable by the processing circuitry, whereby the channel estimator is operative to perform a method comprising:
producing a single tap equalizer ($\overline{Q}$) based on a multi-tap equalizer (Q);
producing an inverse effective-channel estimate ($Q_e$) based on $\overline{Q}$;
inverting $Q_e$ to produce an effective-channel estimate ($H_e$); and
producing $H_a$ based on $H_e$, wherein $H_a$ can be used to determine one or more performance metrics.

19. A network node comprising the channel estimator of claim 18.

* * * * *